Figures 2, 3, 9:
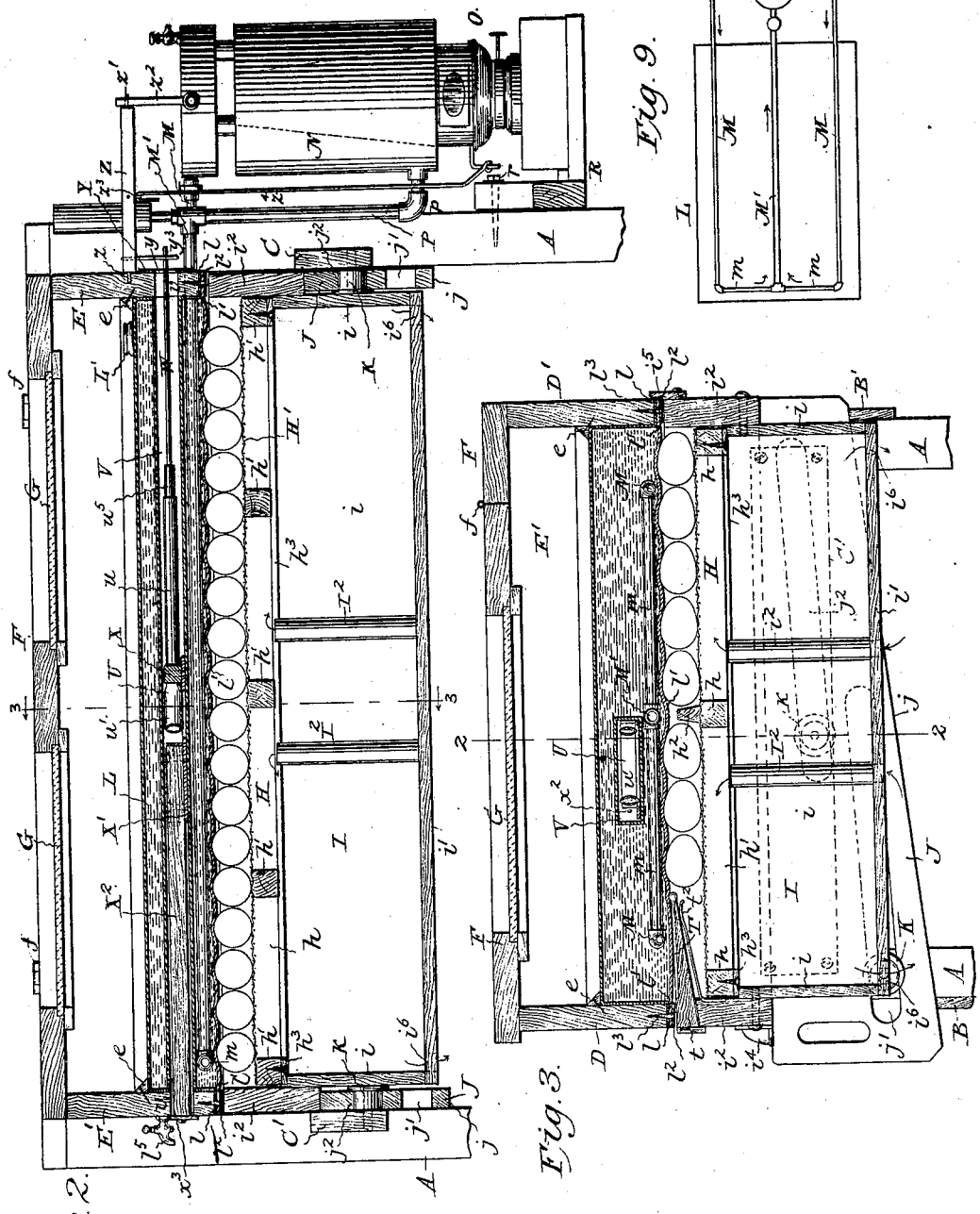
Figure 4:
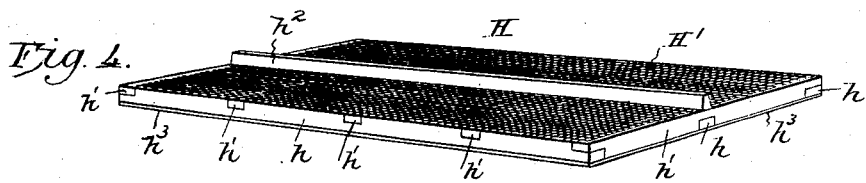

No. 678,053. Patented July 9, 1901.
A. A. SKINNER.
INCUBATOR.
(Application filed Sept. 28, 1900.)
(No Model.) 3 Sheets—Sheet 1.
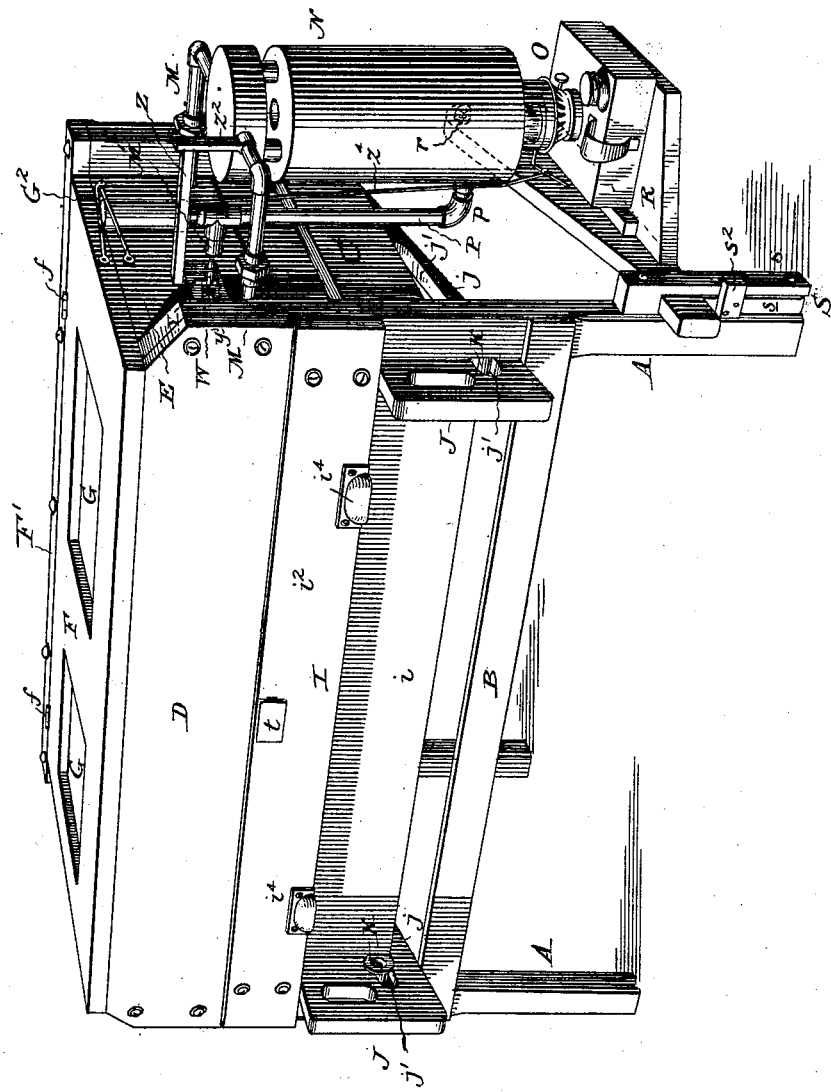
Witnesses
Inventor,
Alba A. Skinner.
by his attorneys No. 678,053. Patented July 9, 1901.
A. A. SKINNER.
INCUBATOR.
(Application filed Sept. 28, 1900.)
(No Model.) 3 Sheets—Sheet 2.

Witnesses
Inventor,
Alba A. Skinner,
by his attorneys

No. 678,053. Patented July 9, 1901.
A. A. SKINNER.
INCUBATOR.
(Application filed Sept. 28, 1900.)
(No Model.) 3 Sheets—Sheet 3.

Witnesses

Inventor,
Alba A. Skinner,
by his attorneys

THE NORRIS PETERS CO., PHOTO-LITHO., WASHINGTON, D. C.

UNITED STATES PATENT OFFICE.

ALBA A. SKINNER, OF GREENE, NEW YORK.

INCUBATOR.

SPECIFICATION forming part of Letters Patent No. 678,053, dated July 9, 1901.

Application filed September 28, 1900. Serial No. 31,401. (No model.)

*To all whom it may concern:*

Be it known that I, ALBA A. SKINNER, a citizen of the United States, residing at Greene, in the county of Chenango and State of New York, have invented certain new and useful Improvements in Incubators, of which the following is a specification.

Nearly all of the incubators in use prior to my invention provided for heating the eggs by means of hot air, and in order that the eggs need not be dried used evaporating-pans to supply the requisite amount of vapor to keep the air moist.

One object of my invention is to provide an incubator in which the necessary warmth is applied to the tops of the eggs by direct contact between the eggs and a soft heating-surface in the same manner as warmth is applied to eggs by a sitting hen and to dispense with evaporating-pans, the eggs being ventilated without being dried by devices which, while supplying the eggs with fresh air and carrying off the foul air, do not dry or chill the eggs nor overheat them.

In those incubators which depend on heated air to supply the necessary warmth the eggs are subjected to unequal temperature when the trays are withdrawn to turn the eggs or for other purposes—*i. e.*, the opening of the incubator causes the temperature to fall within the hatching-chamber and some little time elapses after the incubator is closed before the normal temperature is regained.

Another object of my invention is to provide means whereby the temperature is maintained without variation.

Other objects of my invention are to provide improved devices for regulating the temperature, improved means for reading the temperature, and improved devices for supporting the eggs and for withdrawing them from the hatching-chamber for inspection or for other purposes.

These are the main objects of my invention; but I also desire to improve the general construction of incubators and to provide means for not only efficiently performing the operation of hatching, but for rendering the care of the incubator easier and more certain.
In carrying out my invention I provide a tray of an improved construction, on which the eggs are supported, and support this tray on a drawer within which is a large ventilating-chamber below the tray. The drawer supporting the tray is in turn supported on slides, which may be adjusted to lower the drawer and tray and to support them either when in position to hold the eggs in the hatching-chamber or to hold them outside the hatching-chamber. Over the tray is arranged a heater consisting of a closed metal tank with a bottom of rubber or other flexible material, the under surface of which is in direct contact with the tops of the eggs. The tank is filled with water, and after being filled is hermetically sealed, so that there is no internal pressure tending to expand the flexible bottom, which is maintained in a substantially level or horizontal position by means of external air-pressure. In order to heat the water in the tank, I provide circulating-pipes, which are preferably connected with a boiler heated by a lamp, which latter is provided with devices for regulating the flame to maintain the proper temperature. A thermostat of an improved construction is arranged within the water-tank and is connected with the devices for regulating the flame. In order to read the temperature, I provide a thermometer which is so arranged as to bear against the flexible bottom of the tank, and is thus subject to the same temperature as the eggs with which the flexible bottom is in contact. The tray supporting the eggs, as before stated, is arranged over a ventilating-chamber which is of large area and is provided with escape-holes in its bottom for the discharge of foul air, while fresh air is conveyed into the chamber by means of pipes which discharge near the upper portion thereof, so that the fresh air is distributed among the eggs above the foul air, which latter is discharged at the bottom of the chamber, as before stated. The general organization of the apparatus, together with the details of construction, will be hereinafter more fully described.

In the accompanying drawings, Figure 1 is a perspective view of an incubator embodying my improvements. Fig. 2 shows a longitudinal central section therethrough on the line 2 2 of Fig. 3, the legs or standards being partly broken away. Fig. 3 shows a central transverse section on the line 3 3 of Fig. 2 looking in the direction of the arrows. Fig.

Figure 5:
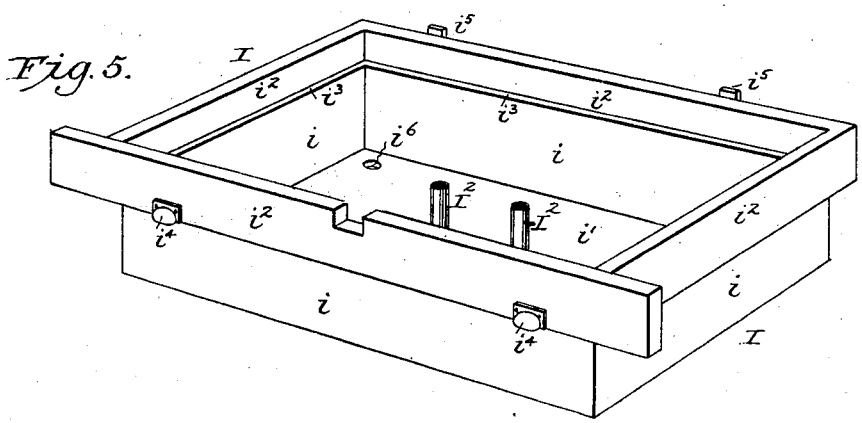
Figure 6:
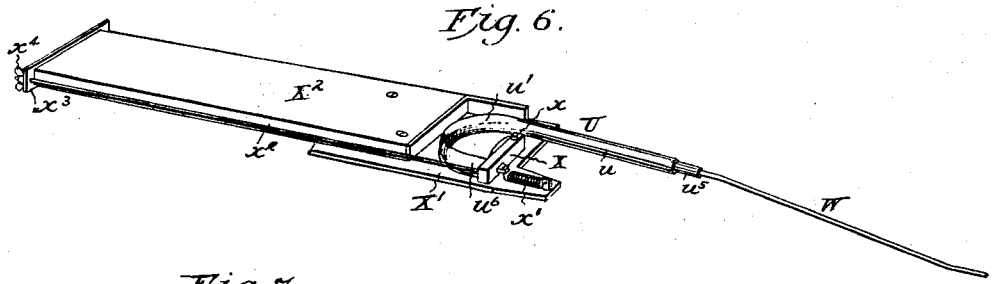
Figure 7:
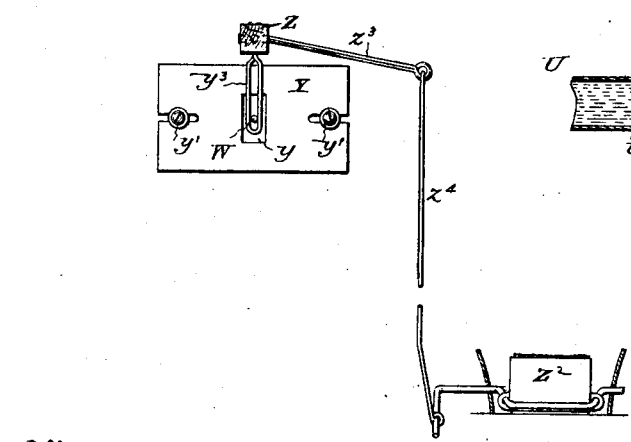
Figure 8:
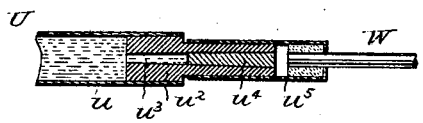

4 is a perspective view of the egg-supporting tray. Fig. 5 is a perspective view of the drawer for supporting the egg-tray and which contains the ventilating-chamber. Fig. 6 is a perspective view of my improved thermostat. Fig. 7 is a detail view illustrating the connections between the thermostat and the lamp-regulating devices. Fig. 8 is a detail view of a portion of the thermostat, and Fig. 9 is a plan view illustrating the arrangement of the heating-pipes in the tank.

The main frame of the incubator may be of any suitable construction so long as it is adapted to support the working parts of my improved apparatus. As shown, there are four legs or standards A, connected at front and rear by longitudinal boards B B' and at each side by cross-pieces C C'. The upper part of the incubator above the egg-tray is inclosed by a front piece D, a back piece D', and side pieces E E'. A top or cover F is hinged at $f$ to a board F', running longitudinally along the back of the incubator and secured to the top of the back piece D' and to the top of the back legs A. The cover is provided with windows G and may be held elevated by means of a brace $G^2$ of well-known construction. (Illustrated in Fig. 1.)

The egg-supporting tray H comprises a frame preferably made of three longitudinal pieces $h$ and five cross-pieces $h'$. On the top of this frame wire-netting H' is secured, and preferably a longitudinal strip $H^2$ is secured over the netting above the central longitudinal strip $h$. I also secure to the bottom of the frame thin strips $h^3$. These are secured by devices which may be readily loosened, so that the strips may be removed when required. The purpose of this arrangement is to provide means for raising and lowering the tray to accommodate eggs of different sizes. When hens' eggs are used, the strips $h^3$ are secured in place on the bottom of the frame, but when ducks' eggs are to be hatched the strips $h^3$ are removed, thus allowing the tray to be supported at a lower elevation. The tray rests in a drawer I. (Shown in Fig. 5.) This is composed of four boards $i$, forming the front and rear and two opposite sides, a bottom piece $i'$, and four top pieces $i^2$. The top pieces are secured to the outsides of the front and rear and side pieces and project above them, thus forming a ledge $i^3$, on which the tray rests. The front top piece $i^2$ is provided at opposite ends with extensions overlapping the front legs A, as shown in Fig. 1. Handles $i^4$ are secured to the front top piece $i^2$, and stops $i^5$ are secured to the rear top piece $i^2$. At each corner of the drawer the bottom is formed with a hole $i^6$, through which foul air escapes, and preferably near the center of the bottom piece I arrange tubes $I^2$, which extend up into the drawer, preferably to the level of the ledge $i^3$. Air passes up into the tubes through the bottom of the drawer, as illustrated in Fig. 3, and it passes from the tops of the tubes and is distributed among the eggs.

The drawer is supported on slides J, which have straight horizontal upper surfaces and inclined lower surfaces $j$. Each of the slides is formed with two inclined slots $j'$ $j^2$, into which project rollers secured to the main frame and which support the slides. One roller K for each slide is secured to one of the front legs A, while another roller for each slide is secured to one of the side pieces C C'. The rollers project through the slots and are flanged, as shown. When the slides are pushed in, their front and rear ends rest upon the cross-pieces B and B', and thus relieve the rollers from weight. While the slides are being withdrawn and when withdrawn they are supported entirely by the rollers. By this arrangement when the slides are pushed in the drawer I and the tray H, carried thereby, are held at the highest elevation. When the slides are pulled out a short distance, the drawer and tray are lowered. By pulling out both the slides and the drawer the eggs may be withdrawn from the hatching-chamber and displayed in front of the incubator.

In order to prevent the drawer from being opened before it is lowered, I secure to the back of the drawer one or more stops $i^5$, which when the drawer is closed and elevated project behind the back piece D. When, however, the drawer is lowered, the stops clear the back piece and the drawer may be pulled out.

Immediately above the egg-tray is arranged a hot-water tank L, the sides and top of which are preferably made of sheet metal, such as copper, while the bottom is made of some flexible material, such as sheet-rubber packing. The lower edges of the sides are flanged at $l$, the flanges projecting outwardly, and the edges of the sheet-rubber $l'$ are secured to these flanges. The flanges $l$ project beneath the edges of the front and rear and side pieces D D' and E E', and the edges of the sheet-rubber are secured beneath the flanges by means of strips of metal $l^2$ and screws or other securing devices $l^3$. White lead or other suitable substance may be employed in addition to provide a water-tight packing. The tank is closed hermetically, so that when filled with water there is no internal pressure beyond the weight of the water, and the arrangement is such that the rubber bottom is maintained at all times in a substantially horizontal position and does not sag nor bag nor permit undue weight to be applied to the eggs which are in contact with it, as will be hereinafter described. It is desirable that the flexible bottom should be in a substantially horizontal position, as by this means a uniform temperature is applied to the eggs. If the bottom were not horizontal and the water in the tank varied in depth, a varying temperature would be imparted to the eggs. It is important that the tank should be hermetically sealed, as before stated, because if an egg were pipped and undue weight were forced upon it it would be prematurely crushed and the chick would not be able to withdraw from the shell. The tank may be filled with water through an opening in the top thereof provided with a screw-cap L'. At one end the tank is provided with a cock $l^5$, by which means the level of the water may be lowered, if desired, or some of the water drawn out should the pressure be too great or the flexible bottom tend to bulge. In order to heat the water in the tank, I provide pipes for circulating hot water, these pipes being preferably arranged as shown in Fig. 9. There are two inlet-pipes M and a single discharge-pipe M'. The inlet-pipes extend from one side of the tank to the other near the front and rear portions thereof. The outlet-pipe M' is near the middle of the tank and is connected with the inlet-pipes M at their inner ends by branch pipes $m$. All the pipes are preferably arranged near the bottom of the tank, just over the flexible bottom $l'$. It will thus be seen that the heating medium passes first along the edge of the tank, which is most likely to be cool, while it passes out of the tank along the central portion thereof, which is more apt to be always warm. It will be seen that I do not introduce hot water directly into the tank, and therefore do not vary the pressure of the water in the tank, but merely provide means for keeping the water warm without increasing its pressure. The inlet-pipes M are each connected with a boiler N, heated by a lamp O. The outlet-pipe is connected to a pipe P, coupled at $p$ to the lower portion of the boiler. The boiler may be of any usual construction, and the lamp is supported beneath the boiler on a bracket R, which is hinged at $r$ to one of the rear legs and is supported at its front end by a supporting device S. This preferably consists of a block $s$, pivoted to one of the front legs A and arranged between this leg and a guide $s'$. The block $s$ is pivoted at its lower end and near its upper end it is provided with a stop $s^2$. When in the position shown in Fig. 1, the bracket is supported so as to hold the lamp in proper position beneath the boiler to heat it. By swinging the block on its pivot the bracket may be lowered and the lamp removed. In order to hold the tank firmly in place, I secure strips $e$ to the inside of the front and rear and side pieces D D' E E', as indicated in Figs. 2 and 3. In order to read the temperature, I provide a thermometer T. This is arranged on a block $t$, preferably of triangular shape in longitudinal section, as shown in Fig. 3. The block bearing the thermometer is inserted through an opening in the front piece $i^2$ of the drawer. The bulb of the thermometer is arranged to bear against the flexible bottom of the tank, and the block is supported at its inner end by means of a spring $l^2$. The spring bearing against the inner end of the block near the bulb presses the bulb up against the flexible bottom of the tank. The arrangement is such that the block bearing the thermometer may be readily inserted and withdrawn for reading the temperature, and as the thermometer bears against the same surface that heats the eggs the exact temperature of the eggs may be readily determined.

The arrangement of the apparatus is such that in normal operation the heat is quite uniform; but nevertheless, owing to various contingencies, it is necessary to provide automatic means for regulating the temperature. The means very generally used is a device for regulating the flame of the lamp by means of a thermostat. I have provided improved devices for adjusting the flame of the lamp. The thermostat U is arranged in a case V, extending longitudinally through the tank L. The interior of the case has no communication with the tank. It is water-tight and open at opposite ends, and it extends through openings $v$ in the side pieces E E'. The details of the thermostat are shown in Fig. 6. In constructing this thermostat I employ a tube $u$, having a curved flattened portion $u'$. In one end of the tube is secured a plug $u^2$, having a tapered opening $u^3$ closed by a tapered stopper $u^4$. On the outer end of the plug $u^2$ is secured a metal tube $u^5$, which may be adjusted on the plug. A rod W is secured to the end of the tube $u^5$ by means of cement or other suitable substance. The inner end $u^6$ of the tube is secured to a pivoted block X. This block is pivoted at $x$ to a metal plate X', which is in turn secured to a base-piece $X^2$. The end $u^6$ of the flattened portion of the tube is hermetically sealed, and the tube being supported by the block X is adapted to move therewith. A spring $x'$ draws the block X in one direction, while the block may be adjusted in the opposite direction by means of a rod $x^2$, extending through a plate $x^3$ on the end of the base-piece and provided with an adjusting-nut $x^4$. By this arrangement the tube and the rod W may be adjusted. The tube is filled with alcohol or other suitable substance that will be sensitive to variations in temperature. As the heat increases the curved flattened portion of the tube will tend to straighten out, and will thus give a corresponding movement to the rod W. When the temperature decreases, the curved flattened portion of the tube will tend to curve, and thus produce an opposite movement to the rod W. By means of the tube $u^5$ the length of the rod W relatively to the tube $u$ may be varied. The base-piece $X^2$ is secured in the chamber V. The plate $x^3$ is arranged outside the side piece E', as shown in Fig. 2, the adjusting-screw $x^4$ being within convenient reach of the attendant. By thus arranging the thermostat in a casing within the tank I provide against subjecting the thermostat to unequal temperatures, which would tend to unnecessarily raise and lower the flame of the lamp. When the drawer is opened, cool air is admitted, and if this cool air came in contact with the thermostat it would operate it to vary the flame; but in my apparatus the opening of the drawer does not cause such a variation of temperature in the air surrounding the thermostat as to appreciably affect it. It will also be observed that when the drawer is opened and cool air enters into the ventilating-chamber the heating-surface is not materially lowered in temperature. As soon as the drawer is closed and the eggs are brought into contact with the heating-surface they immediately receive the normal heat requisite for incubation. In other incubators some little time elapses before the eggs are subjected to the proper atmosphere, while in my apparatus they are immediately subjected to the proper temperature. The end of the rod W projects through the opening $v$ in the side piece E and also through an opening $y$ in a plate Y, attached to the outside of the side piece E by means of screws $y'$, extending through slots in the plate Y. Just above the outer end of the rod W is mounted a rock-shaft Z, pivoted at $z$ to the side piece E and at $z'$ to a standard $z^2$, secured to one of the pipes M. This rock-shaft is provided with an arm $z^3$, to which is connected a link $z^4$, in turn connected with a sleeve $Z^2$, which is adapted to vary the flame of the lamp to increase and decrease the heat. This device is of well-known construction and need not be described in detail. The end of the rod W extends through a looped wire $y^3$, attached to the under side of the rock-shaft Z. The arrangement is such that when the thermostat is expanded or contracted a horizontal motion is given to the rod W, and this motion is imparted through the loop $y^3$ to the rock-shaft Z, which correspondingly moves the arm $z^3$ and the link $z^4$ and by the connections shown in Fig. 7 raises or lowers the sleeve $Z^2$. The opening $v$ in the side piece E is made quite large, while the opening $y$ in the plate Y is somewhat smaller; but in order that the end of the rod W may be properly located at all times in the opening $y$ the plate Y is made adjustable by the screws $y'$— that is to say, the plate Y may be slid horizontally in either direction, so that the movement of the rod W may not be unduly impeded, and yet the plate should be so adjusted that the rod W shall not move too far in either direction, so as to either raise or lower the sleeve $Z^2$ too much. The eggs, it will be observed, are in direct contact with the flexible bottom $l'$ of the heating-tank, and thus obtain warmth therefrom in a manner similar to that in which eggs receive warmth from a sitting hen. The apparatus does not depend upon the circulation of heated air, and no evaporating-pans need be employed in the apparatus, fresh air being admitted just under the egg-tray and distributed among the eggs. The foul air naturally descends and passes out through the openings in the bottom of the drawer. The drawer is made somewhat deep, so as to facilitate this operation. It will be observed that there is a space between the top of the tank L and the bottom of the cover, and this may be employed as a nursery for young chicks just after they are hatched. If desired, the top of the metal tank may be covered with felt or some other suitable substance, and this chamber may also be used for starting fresh eggs before they are placed upon the tray. The arrangement is such that the tray holds the eggs just high enough to cause them to bear gently against the bottom $l'$. Where hens' eggs are used, the strips $h^3$ are employed to hold the tray at the proper elevation. Where larger eggs, such as ducks' eggs, are used, these strips are removed, so that the tray is held slightly lower, but sufficiently high to provide the required contact between the eggs under the heating-surface.

I claim as my invention—

1. An incubator provided with a tray for supporting the eggs, and a hermetically-sealed tank containing a heating medium below atmospheric pressure and provided with a flexible bottom in direct contact with the eggs.

2. An incubator provided with a tray for supporting the eggs, and a hermetically-sealed tank containing a heating medium and provided with a straight horizontal flexible bottom in direct contact with the eggs.

3. An incubator provided with a tray for supporting the eggs, a tank containing water and provided with a filling-orifice closed by a cover, and a draw-off cock, a flexible bottom for the tank, and pipes arranged within the tank through which a heating medium circulates without increasing the pressure in the tank.

4. An incubator provided with a tank, having a flexible bottom, and circulating-pipes for the heating medium within the tank, two of said pipes being inlet-pipes and conveying the heating medium along the opposite sides of the tank, one of said pipes being centrally arranged between the inlet-pipes and adapted to discharge the heating medium, said outlet-pipe being connected with the two inlet-pipes by branch pipes.

5. The combination of a heating-tank having a flexible bottom and a thermometer, the bulb of which is arranged in contact with the flexible bottom of the tank.

6. The combination of a heating-tank having a flexible bottom, a thermometer projecting from the outside into the hatching-chamber, and a spring for pressing the bulb of the thermometer against the flexible bottom of the tank.

7. The combination of a heating-tank, a casing within the tank, a thermostat within said casing, heating mechanism and connections between the thermostat and the heating mechanism.

8. The combination of a heating-tank, a casing arranged within the tank, a thermostat within the casing, devices at one end of the casing for adjusting the thermostat, a heater, and connections between the heater and the thermostat.

9. The combination of a heating-tank, a casing within the tank open at opposite ends, a thermostat removable endwise from the casing, devices outside the casing for adjusting the thermostat, a heater, and connections between the thermostat and the heater.

10. The combination of a thermostat having a vibrating rod, a slotted plate through which the rod projects, devices for adjusting the plate, a heater, and connections between the thermostat-rod and the heater.

11. The combination of a thermostat having a vibrating rod, a rock-shaft, a heater, an arm on the rock-shaft connected with the heater, and connections between the rock-shaft and the thermostat-rod.

12. The combination of a drawer for supporting an egg-tray, the slides on which the drawer rests, and devices for lowering the slides and withdrawing them, to permit the lowering and withdrawal of the drawer with the tray.

13. The combination of an egg-tray, a drawer on which the tray rests, the slides having straight upper surfaces on which the drawer is supported, and inclined slots, and rollers supported on the main frame projecting into the slots.

14. The combination with a tray for supporting the eggs, of a ventilating-chamber below the tray having an exit-opening in the bottom, and a tube having its lower end on approximately the same level as the exit-opening open to the atmosphere and extending to near the top of the ventilating-chamber and terminating below the tray, for admitting fresh air at normal temperature.

15. The combination of an egg-tray, a drawer on which the tray is supported, slides on which the drawer rests and which have inclined slots, rollers supported on the main frame extending through the slots, and a stop on the drawer engaging the main frame to prevent the opening of the drawer until it is lowered.

16. The combination of a heating-tank having a flexible bottom, an egg-tray below the tank which holds the eggs in contact with the flexible bottom, a drawer on which the egg-tray is supported, the slides on which the drawer rests and which have inclined slots, and rollers on the main frame projecting through the slots.

17. The combination with a tray for supporting the eggs, of a ventilating-chamber below the tray having an exit-opening in each corner at the bottom, and tubes arranged in the central portion of the tray, open at the bottom to the atmosphere, for admitting fresh air at normal temperature and extending upwardly to near the top of the ventilating-chamber and terminating below the tray.

18. The combination of a tray for supporting the eggs, a heater arranged above the tray, a ventilating-chamber below the tray having an exit-opening in the bottom, and a tube for admitting fresh air at normal temperature, extending up to near the top of the ventilating-chamber and terminating below the tray.

In testimony whereof I have hereunto subscribed my name.

ALBA A. SKINNER.

Witnesses:
C. E. WHEELER,
JOHN E. WHEELER.